United States Patent [19]

Hambrecht et al.

[11] Patent Number: 4,536,567
[45] Date of Patent: Aug. 20, 1985

[54] REMOVAL OF THE CATALYST FROM POLYPHENYLENE ETHERS

[75] Inventors: Juergen Hambrecht, Heidelberg; Rudi W. Reffert, Beindersheim; Peter Minges; Johann Swoboda, both of Ludwigshafen, all of Fed. Rep. of Germany

[73] Assignee: BASF Aktiengesellschaft, Fed. Rep. of Germany

[21] Appl. No.: 631,948

[22] Filed: Jul. 18, 1984

[30] Foreign Application Priority Data

Jul. 19, 1983 [DE] Fed. Rep. of Germany ....... 3325894

[51] Int. Cl.$^3$ ............................................ C08G 65/44
[52] U.S. Cl. .................................. 528/486; 528/212; 528/214; 528/215; 528/487; 528/492
[58] Field of Search ............... 528/486, 487, 492, 212, 528/214, 215

[56] References Cited

U.S. PATENT DOCUMENTS

| | | | |
|---|---|---|---|
| 3,219,625 | 11/1965 | Blanchard et al. | 260/47 |
| 3,378,505 | 4/1968 | Hay | 260/2.1 |
| 3,661,848 | 5/1972 | Cooper et al. | 260/47 |
| 3,838,102 | 9/1974 | Bennett et al. | 528/486 |
| 3,984,374 | 10/1976 | Cooper et al. | 260/47 |
| 4,026,870 | 5/1977 | Floryan et al. | 528/215 |
| 4,039,510 | 8/1977 | Cooper et al. | 528/486 |
| 4,237,265 | 12/1980 | Eliassen et al. | 528/487 |
| 4,460,764 | 7/1984 | Reffert et al. | 528/492 |
| 4,463,164 | 7/1984 | Dalton et al. | 528/486 |

FOREIGN PATENT DOCUMENTS

| | | |
|---|---|---|
| 0100048 | 7/1983 | European Pat. Off. . |
| 1572847 | 5/1969 | France . |
| 2334702 | 7/1977 | France . |
| 1219335 | 1/1971 | United Kingdom . |

Primary Examiner—Lester L. Lee
Attorney, Agent, or Firm—Keil & Weinkauf

[57] ABSTRACT

High molecular weight polyphenylene ethers are prepared from a monohydric phenol by an oxidative coupling reaction with oxygen in the presence of a catalyst complex obtained from a copper salt and an organic amine, and in the presence of a solvent, by a process in which the metal component of the catalyst is removed after the polymerization by adding one or more organic ammonium salts of the general formula

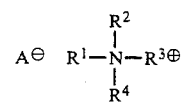

where $A^\ominus$ is an anion or polyanion of an organic carboxylic, sulfonic or phosphonic acid, $R^1$ is hydrogen, $R^2$ and $R^3$ are each hydrogen, alkyl of 1 to 18 carbon atoms or aryl and $R^4$ is alkyl of 1 to 18 carbon atoms or aryl.

5 Claims, No Drawings

REMOVAL OF THE CATALYST FROM POLYPHENYLENE ETHERS

The present invention relates to a process for the preparation of high molecular weight polyphenylene ethers from a monohydric phenol, which is alkyl-substituted at the two ortho-positions but not at the para-position and may or may not be alkyl-substituted at the meta-position, by an oxidative coupling reaction with oxygen at from 10° to 50° C. in the presence of a catalyst complex obtained from a copper salt and an organic amine, in the presence of from 1 to 20 parts by weight of a solvent per part by weight of the monomeric phenol, and in the presence or absence of an activator.

Polyphenylene ethers and processes for their preparation are well known and have been described in many publications, for example U.S. Pat. Nos. 3,306,874, 3,306,875, 3,639,656, 3,642,699 and 3,661,848, the disclosures of which are incorporated in the present application.

The processes most frequently used for the preparation of polyphenylene ethers comprise autocondensation of monohydric phenols in the presence of oxygen and of a catalyst. Preferred catalysts are metal-amine complexes, in particular Cu-amine complexes, and preferred solvents are aromatic hydrocarbons. The reaction is usually terminated by removing the catalyst from the reaction mixture. This is done using an aqueous solution of an inorganic or organic acid, for example by the countercurrent extraction method described in German Laid-Open Application DOS No. 2,105,372. Other compounds used are polyaminocarboxylic acids (cf. German Laid-Open Application DOS No. 2,364,319) or other chelating agents, eg. nitrilotriacetic acid and its sodium salts or ethylenediaminetetraacetic acid and its sodium salts (cf. German Laid-Open Application DOS No. 2,532,477), the latter also in combination with quaternary ammonium salts (cf. U.S. Pat. No. 4,026,870). Apart from terminating the oxidative autocondensation, the addition of the complex-forming agent is aimed at achieving very substantially complete removal of the catalyst from the polyphenylene ether, since contamination of the polymer by residual metal has an adverse effect on the entire spectrum of properties for the polymer. The sensitivity to oxidation and the inherent color are particularly affected. All conventional measures for removing the residual catalyst have the disadvantage that repeated extraction steps, entailing complicated separation processes in some cases, have to be used in order to achieve complete removal (residual amount of metal ions 10 ppm). Frequently, these procedures change the character of the polyphenylene ether, pronounced discoloration, in particular, being indicative of this.

It is an object of the present invention to provide a simple and highly effective process for removing the residual catalyst in the autocondensation of monohydric phenols in the presence of oxygen, which process, in particular, prevents the discoloration of the resulting polyphenylene ether solutions.

We have found that this object is achieved, in accordance with the invention, if the metal component of the catalyst is removed after the polymerization by adding one or more ammonium salts of the general formula

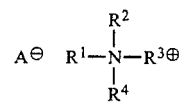

where $A^{\ominus}$ is an anion or a polyanion of an organic carboxylic, sulfonic or phosphonic acid, $R^1$ is hydrogen, $R^2$ and $R^3$ are each hydrogen, alkyl of 1 to 18 carbon atoms or aryl and $R^4$ is alkyl of 1 to 18 carbon atoms or aryl.

Preferred processes are those in which the ammonium salt or salts are formed from amine components such as monoalkylamines, dialkylamines, trialkylamines, arylamines or alkylarylamines, those in which anions and polyanions of polycarboxylic acids, polyalkylenepolycarboxylic acids, aminocarboxylic acids, aminopolycarboxylic acids, polyaminocarboxylic acids, polyphosphonic acids and polyaminophosphonic acids are used, those in which ammonium salts of mono-, di- and trialkylamines containing linear or branched, saturated or unsaturated $C_1$–$C_{18}$-alkyl groups are employed, or those in which the catalyst is separated off using water-soluble monoalkylammonium, dialkylammonium or trialkylammonium salts of ethylenediaminetetraacetic acid or of nitrilotriacetic acid, or using polydialkylammonium polyacrylates or acrylic acid/maleic anhydride copolymers.

The agent used for separating off the catalyst is preferably employed in an amount such that there are from 1 to 100 moles of ammonium salt per mole of metal ions in the catalyst.

High molecular weight polyphenylene ethers are the compounds obtained when 2,6-dialkylphenols are subjected to oxidative coupling to give a chain of alkyl-substituted benzene rings bonded in the para-position by oxygen atoms forming ether bonds. The novel polymers have molecular weights of from 10,000 to 90,000, preferably from 20,000 to 80,000, determined by the method given in Macromolecular Synthesis 1 (1978), 83. High molecular weight polyphenylene ethers, also referred to as poly(phenylene oxides), have long been known from the literature (cf. for example U.S. Pat. Nos. 3,661,848, 3,219,625 or 3,378,505), so that further description is unnecessary here.

The monohydric phenols which are used for the preparation of the high molecular weight polyphenylene ethers, and which are alkyl-substituted at the two ortho-positions but not at the para-position and may or may not be alkyl-substituted at the meta-position, are conventional phenols, such as 2,6-dimethylphenol, 2,6-diethylphenol, 2-methyl-6-ethylphenol, 2-methyl-6-propylphenol, 2,6-dibutylphenol, 2,3,6-trimethylphenol or 2,3,5,6-tetramethylphenol, or mixtures of these.

To carry out the polycondensation, oxygen is usually passed into the solution of the monomers in the presence of a catalyst complex, the monomer solution being at 10°–50° C. The flow rate for oxygen is essentially the same as that stated in U.S. Pat. Nos. 3,306,874 and 3,306,875. In the preferred process, a solution of the monomers is initially taken, and the catalyst comprising the copper salts, preferably copper(I) bromide, and the amine and from 0.01 to 5% by weight of 2,6-dimethylphenol are metered into the monomer solution.

The catalyst complex conventionally used for the polycondensation usually comprises a combination of an amine, eg. di-n-butylamine, diethylamine, picoline, quinoline, a pyridine base, triisopropylamine, dimethylisopropanolamine, triethanolamine, triisopropanolamine or diisopropanolamine, with a copper salt, such as copper(I) bromide, copper(I) chloride, copper(I) iodide, copper(II) acetate, copper(II) propionate, copper(II) ethylacetoacetate or copper(II) acetylacetonate. The amines are preferably used in an amount of from 2.0 to 25.0 moles per 100 moles of monomer. The concentration of the amines in the reaction mixture can vary within wide limits, but relatively low concentrations are advantageous. The concentration of the copper salts is kept low, and is preferably from 0.2 to 2.5 moles per 100 moles of monomer.

The ratio of solvent to monomer is usually from 1:1 to 20:1, ie. not more than a 20-fold excess of solvent.

The solvents used are benzene, toluene and aliphatic hydrocarbons, preferably $C_6$–$C_{10}$-hydrocarbons. The reaction mixture can also contain an activator, such as a diarylguanidine or a diarylformamidine (cf. U.S. Pat. No. 3,544,515).

In the process according to the application, the polycondensation reaction is carried out at from 10° to 50° C., preferably from 18° to 22° C. To carry out the process, the oxygen is passed into the solution of the monomer in the presence of the novel amine complex, the monomer solution being at 10°–50° C. Reaction is complete within a short time, ie. the catalyst mixture is metered into the monomer solution in the course of from 0.1 to 1.5 hours, while gassing with oxygen or air.

When the desired yield has been achieved in the polycondensation, and the polymer has reached the desired molecular weight, the reaction solution contains from 1 to 30% by weight of polyphenylene ether, from 0.005 to 1.5% by weight of metal ions and about 0.1–6.0% by weight of amine, and may contain a small amount of other materials. These reaction solutions are treated, in accordance with the invention, with the complex-forming and salt-forming ammonium salts of the general formula

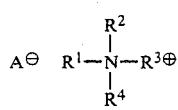

in order to separate off the metal catalyst present in the polymer. The manner in which the organic ammonium or polyammonium salt is added is not critical. It can be added all at once or in several portions, either continuously or batchwise, with or without additional water. To simplify the embodiment, it is advantageous to use an aqueous solution of the ammonium salt. Separation of the metal component can be carried out in a suitable apparatus, eg. a filter press, a decantation tank, a knife-discharge centrifuge or the like.

The time during which the complex-forming and salt-forming agent is in contact with the catalyst-containing polyphenylene ether phase can vary within wide limits. Reaction times of from 1 minute to 5 hours are preferred, although from 5 to 60 minutes are frequently sufficient. The preferred reaction temperature is from 20° to 90° C., but may be above or below this range. The novel ammonium salts used, of the general formula

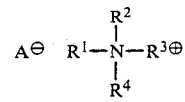

are compounds in which the anion or polyanion $A^\ominus$ is that of an organic carboxylic acid, a sulfonic acid or a phosphonic acid, $R^1$ is H, $R^2$ and $R^3$ are each H, $C_1$–$C_{18}$-alkyl or aryl and $R^4$ is $C_1$–$C_{18}$-alkyl or aryl.

Examples of anions and polyanions $A^\ominus$ are those derived from carboxylic acids, polycarboxylic acids and polymeric polycarboxylic acids, such as oxalic acid, citric acid, polyacrylic acid or copolymers of acrylic acid and maleic anhydride, aminocarboxylic acids such as glycine, aminopolycarboxylic acids, such as nitrilotriacetic acid, polyalkylenepolyaminocarboxylic acids, such as ethylenediaminetetraacetic acid, hydroxyethylethylenediaminetriacetic acid or diethylenetriaminepentaacetic acid, polysulfonic acids, such as sulfonated polystyrene, polyphosphonic acids, polyalkylenepolyphosphonic acids, hydroxyalkylenepolyphosphonic acids, aminopoly(alkylenephosphonic acids) and alkylenediaminodicarboxylic acid-poly(alkylenephosphonic acids).

Particularly preferably used anions are those of citric acid, polyacrylic acid having a K value of from 10 to 50 (determined in accordance with DIN No. 53,726 in a 1% strength solution in dimethylformamide), glycine, nitrilotriacetic acid, ethylenediaminetetraacetic acid, 1-aminoethane-1,1-diphosphonic acid, aminotris(methylenephosphonic acid) or ethylenediaminetetra(methylenephosphonic acid).

The amine component used for the novel ammonium salt is a monoalkylamine, a dialkylamine, trialkylamine, an arylamine or an aralkylamine, where alkyl is of 1 to 18, preferably 1 to 12, carbon atoms and may be linear, branched or cyclic and saturated or unsaturated. It is also possible to use any other amine which forms a water-soluble ammonium salt with the novel organic anions and polyanions. However, particularly preferred amines are aliphatic and cycloaliphatic amines, eg. mono-, di- and tripropylamine, mono-, di- and tributylamine, mono-sec.-butylamine, mono- and dioctylamine, mono- and diethylhexylamine, dimethylpentylamine, mono- and dicyclohexylamine, ethylmethylamine, dimethylbutylamine, morpholine, methylcyclohexylamine, N,N'-dialkylethylenediamines, N,N',N'-trialkylethylenediamines, N,N'-dialkylpropanediamines, N,N,N'-trialkylpentanediamines and N,N,N',N'-tetraalkylethylenediamines. Particularly preferred amines are those which are also used in the preparation of the catalyst, eg. dibutylamine, octylamine, ethylhexylamine, dimethylpentylamine, dimethyl-n-butylamine, N,N'-di-tert.-butylethylenediamine or N,N,N',N'-tetramethylethylenediamine. It is of course also possible to use a mixture of primary, secondary and tertiary amines for preparing the ammonium salts.

Alkali metal/ammonium salt or alkaline earth metal/ammonium salt mixtures containing the anion $A^\ominus$ may also be used, but this is less advantageous.

Examples of particularly preferred ammonium salts of the general formula

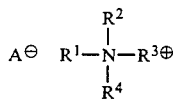

which are used for separating off the catalyst are bis-dibutylammonium citrate, the dimethyl-n-butylammonium salt of glycine, bis- and tris-dipropylammonium nitrilotriacetate, bis- and tris-dibutylammonium ethylenediaminetetraacetate, tris-n-octylammonium ethylenediaminetetraacetate, poly-dibutylammonium polyacrylate (K value 25, 1% strength in dimethylformamide) which is formed at pH 9.5, and the tris-dibutylammonium salt of ethylenediaminetetra(methylenephosphonic acid).

The novel complex-forming and salt-forming organic ammonium salts are used in amounts such that there is not less than 1 mole of ammonium salt groups per mole of metal ion to be removed. In general, from 1.2 to 100, particularly preferably from 2 to 50, equivalents of ammonium salt groups are used per equivalent of heavy metal ion.

The metal catalyst can be removed completely from the polyphenylene ether polymer by repeated addition of the novel ammonium salts or polyammonium salts, followed by separation of the resulting metal complexes and metal salts by the method described above. However, in a preferred embodiment of the invention, the total amount of catalyst is removed from the polymer in one step.

After the metallic component has been removed in the form of a complex and/or salt, the polyphenylene ether can be isolated from the solution by the methods described in the U.S. patents mentioned at the outset. The isolation of the polyphenylene ether is not critical with regard to the present invention. For example, the polyphenylene ether can be isolated by precipitating it from a reaction solution by means of a non-solvent, for example an excess of an alcohol, ie. methanol. The product can be filtered off, suspended in alcohol and, if desired, stirred with a decolorizing agent. The polyphenylene ether is then filtered off and converted by a conventional method to films, fibers, shaped articles or the like. Other alcohols, such as isopropanol, propanol or ethanol, are equally suitable.

The amine component of the catalyst can be recovered by distillation or another conventional method.

A preferred aspect of the present process is the preparation of polyphenylene ether solutions which have a low metal content, and from which the polymeric substances can be obtained by a total isolation method, eg. spray drying, steam precipitation, crumb formation with hot water or flash vaporization. Such processes, which are more economical than the conventional precipitation methods in terms of the energy required, solvent losses and the like, can therefore be used in an economical manner.

The particular advantages obtained using the invention are the following: with the aid of the novel ammonium salts, the residual metal catalyst can be removed virtually completely from the polyphenylene ethers. The resulting polyphenylene ethers, with a residual catalyst metal content of 10 ppm, have an unusually pale natural color and exceptional color stability and stability to oxidation during processing at above 250° C. Removal of the metal catalyst by the novel process is simple and generally takes place in one step. Polyphenylene oxide reaction solutions having a low concentration or a relatively high concentration (as high as 25% by weight) can be converted without problems. Furthermore, an unexpected side effect of the novel process is that, in contrast to all conventional processes, using the ammonium salts of the complex formers has the result that the amine component of the catalyst is no longer transferred to the aqueous phase but remains in the organic phase and hence also contributes to the thermal stabilization of the polyphenylene ether, especially when a total isolation method is employed.

The Examples which follow illustrate the invention but are not intended to restrict it. Parts are by weight, unless stated otherwise.

The intrinsic viscosity was determined by measurement of 0.5% strength solutions in chloroform at 30° C.

The natural color of the polyphenylene ether solutions after removal of the catalyst was assessed visually on the basis of the iodine color scale according to DIN 53,403. In this context, the samples were first assessed at room temperature directly after removal of the catalyst, were heated under nitrogen for 1 hour at 250° C., and were then assessed. The results are summarized in Table 1.

EXAMPLES AND COMPARATIVE EXAMPLES

In the Examples and Comparative Examples which follow, the polymerization and the measures taken for separating off the catalyst are described in detail. In order to elucidate the advantages of the novel process, the following investigations were carried out in all experiments:

(1) The time required, during the removal of the catalyst, for complete separation of the polyphenylene ether-containing organic phase from the aqueous phase containing the extracted residual metal catalyst was determined.

(2) The residual metal catalyst content of the organic phase was determined.

(3) The natural color of the organic phase directly after removal of the catalyst was determined on the basis of the iodine color scale according to DIN No. 53,403.

(4) After the catalyst had been separated off, the organic phase was heated under nitrogen for 1 hour at 250° C., and the natural color was then determined as described above.

(5) After the catalyst had been separated off, the polymer was precipitated with methanol and then dried, after which its intrinsic viscosity was determined.

The results of the investigation are summarized in Table 1. They illustrate the advantages of the novel process, ie. rapid and complete removal of the catalyst (cf. columns 3 and 4 in Table 1) and the high thermostability of the PPE solutions obtained after removal of the catalyst (column 6, Table 1). The Comparative Examples which are also listed record the prior art.

EXAMPLE 1

Preparation of poly-(2,6-dimethyl-1,4-phenylene)ether
Polymerization 1.3 g of Cu(I) bromide, 20 g of 1,4-dimethylpentylamine and 2 g of 2,6-dimethylphenol (DMP) were initially taken and were stirred for 5 minutes at 20° C. while oxygen was passed in, after which the mixture was metered into a solution of 204 g of DMP in 1,400 cm³ of toluene in the course of 30 minutes. Stirring was then continued for a further hour at 20° C. The reaction was carried out in the presence of 30 liters/hour of oxygen.

Removal of the catalyst

When the reaction was complete, 20 ml of a 10% strength aqueous solution of tris-dibutylammonium ethylenediaminetetraacetate were added to the polymerization mixture, and vigorous stirring was then effected for 20 minutes at 60° C. The organic phase and the aqueous phase were then separated, and the investigations described above were carried out. The results are shown in Table 1.

EXAMPLE 2

Preparation of poly-(2,6-dimethyl-1,4-phenylene)ether Polymerization

A solution of 1.2 g of Cu(I) chloride, 1.9 g of sodium bromide and 0.3 g of methyltrioctylammonium chloride in 15 cm³ of methanol was added to 1,100 cm³ of toluene, and the mixture was stirred at 40° C. 14 g of di-n-butylamine and a solution of 275 g of 2,6-dimethylphenol in 400 cm³ of toluene were then added, and the reaction solution was gassed with 0.1 cm³/hour of oxygen in the course of 90 minutes. The oxygen feed was then terminated, and the reaction mixture was flushed with nitrogen.

Removal of the catalyst

When the reaction was complete, the polymer solution was stirred vigorously with 20 cm³ of a 5% strength aqueous soluttion of tris-dibutylammonium ethylenediaminetetraacetate for 30 minutes at 50° C., after which the mixture was heated to 70° C. and the organic phase was separated from the aqueous phase. The investigations described above were then carried out. The results are shown in Table 1.

EXAMPLE 3

Poly-(2,6-dimethyl-1,4-phenylene)ether was prepared as described in Example 1. The polymer solution was also purified as in Example 1, except that 100 cm³ of a 1% strength aqueous solution of tris-dibutylammonium ethylenediaminetetraacetate were used. The properties of the polymer are shown in Table 1.

EXAMPLE 4

The preparation of the poly-(2,6-dimethyl-1,4-phenylene)ether and the removal of the catalyst were carried out as described in Example 2, except that the metal components were separated off using 40 cm³ of a 5% strength aqueous solution of tris-dibutylammonium nitrilotriacetate. The properties of the polymer are shown in Table 1.

EXAMPLE 5

The preparation of the poly-(2,6-dimethyl-1,4-phenylene)ether and the removal of the catalyst were carried out as described in Example 2, except that the metal components of the catalyst were separated off using 100 cm³ of a 2% strength aqueous solution of bis-n-octylammonium ethylenediaminetetraacetate.

EXAMPLE 6

The preparation of the poly-(2,6-dimethyl-1,4-phenylene)ether and the removal of the catalyst were carried out as described in Example 2, except that the catalysts were separated off using 50 cm³ of a 3% strength aqueous solution of the tris-dibutylammonium salt of ethylenediaminetetra(methylenephosphonic acid).

EXAMPLE 7

The procedure described in Example 6 was followed except that the catalysts were separated off using 100 cm³ of a poly-dibutylammonium polyacrylate prepared by reacting a polyacrylic acid having a K value of 30 (measured on a 1% strength solution in dimethylformamide) with dibutylamine at a pH of 1.5.

COMPARATIVE EXAMPLE A (not according to the invention)

The polyphenylene oxide was prepared as described in Example 1. To purify the polymer solution, 4.0 g of ethylenediaminetetraacetic acid (cf. Example 1, German Laid-Open Application DOS No. 2,364,319) were added and the polymer solution was stirred for a further hour at 50° C. The organic phase was separated from the aqueous phase, and the investigations described above were carried out. The results are shown in Table 1.

COMPARATIVE EXAMPLE B (not according to the invention)

The poly-(2,6-dimethyl-1,4-phenylene)ether was prepared as described in Example 2. Purification of the polymer solution to remove residual metal catalyst was carried out as described in Example 6 of German Laid-Open Application DOS No. 2,364,319. After the organic phase and the aqueous phase had been separated, the investigations described above were carried out. The results are shown in Table 1.

TABLE 1

| Example | Intrinsic viscosity (dl/g) | Residual Cu content (ppm) | Time t (min) for complete phase separation | Natural color (mg of iodine) after removal of the catalyst | after heating at 230° C. for 1 hour |
|---|---|---|---|---|---|
| 1 | 0.75 | 0.5 | 5 | 7–10 | 20–30 |
| 2 | 0.62 | 0.2 | 4 | 7–10 | 15–20 |
| 3 | 0.76 | 0.3 | 5 | 7–10 | 15–20 |
| 4 | 0.64 | 0.3 | 6 | 7–10 | 20–30 |
| 5 | 0.65 | 0.3 | 7 | 7–10 | 15–20 |
| 6 | 0.62 | 0.2 | 8 | 7–10 | 15–20 |
| 7 | 0.60 | 0.2 | 8 | 7–10 | 20–30 |
| Comparative Examples (not according to the invention) | | | | | |
| A | 0.60 | 1.6 | 14 | 10–15 | 40–60 |
| B | 0.57 | 1.3 | 12 | 10–15 | 40–60 |

We claim:

1. A process for the preparation of a high molecular weight polyphenylene ether from a monohydric phenol, which is alkyl-substituted at the two ortho-positions but not at the para-position and may or may not be alkyl-substituted at the meta-position, by an oxidative coupling reaction with oxygen at from 10° to 50° C. in the presence of a catalyst complex obtained from a copper salt and an organic amine, in the presence of from 1 to 20 parts by weight of a solvent per part by weight of the monomeric phenol, and in the presence or absence of an activator, wherein the metal component of the catalyst is removed after the polymerization by adding one or more organic ammonium salts of the formula

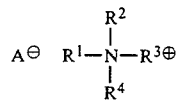

where $A^{\ominus}$ is an anion or polyanion of, a polycarboxylic acid, polyalkylenepolycarboxylic acid, aminocarboxylic acid, aminopolycarboxylic acid, polyaminocarboxylic acid, polyphosphonic acid or polyaminophosphonic acid, $R^1$ is hydrogen, $R^2$ and $R^3$ are each hydrogen, alkyl of 1 to 18 carbon atoms or aryl and $R^4$ is alkyl of 1 to 18 carbon atoms or aryl, and wherein the ammonium salt or salts are formed from monoalkylamines, dialkylamines, trialkylamines, arylamines or alkylarylamines.

2. A process as claimed in claim 1, wherein an ammonium salt of a mono-, di- or trialkylamine containing linear or branched, saturated or unsaturated $C_1$-$C_{18}$-alkyl groups is used.

3. A process as claimed in claim 1, wherein the catalyst is separated off using a water-soluble monoalkylammonium, dialkylammonium or trialkylammonium salt of ethylenediaminetetraacetic acid or of nitrilotriacetic acid.

4. A process as claimed in claim 1, wherein the catalyst is separated off using a poly-dialkylammonium polyacrylate or an acrylic acid/maleic anhydride copolymer.

5. A process as claimed in claim 1, wherein the agent used for separating off the catalyst is employed in an amount such that there are from 1 to 100 moles of ammonium salt groups per mole of metal ion in the catalyst.

* * * * *